US009786094B2

(12) United States Patent
Williams et al.

(10) Patent No.: US 9,786,094 B2
(45) Date of Patent: Oct. 10, 2017

(54) METHOD AND APPARATUS FOR CREATING A DIMENSIONAL LAYER FOR AN IMAGE FILE

(71) Applicant: ELECTRONICS FOR IMAGING, INC., Foster City, CA (US)

(72) Inventors: Leon Williams, Walworth, NY (US); Thor A. Olson, Minnetonka, MN (US)

(73) Assignee: ELECTRONICS FOR IMAGING, INC., Fremont, CA (US)

( * ) Notice: Subject to any disclaimer, the term of this patent is extended or adjusted under 35 U.S.C. 154(b) by 0 days.

(21) Appl. No.: 13/738,776

(22) Filed: Jan. 10, 2013

(65) Prior Publication Data

US 2013/0241930 A1 Sep. 19, 2013

Related U.S. Application Data

(60) Provisional application No. 61/612,842, filed on Mar. 19, 2012.

(51) Int. Cl.
*G06T 15/50* (2011.01)
*G06T 15/04* (2011.01)
(Continued)

(52) U.S. Cl.
CPC ............... *G06T 15/50* (2013.01); *G06F 3/12* (2013.01); *G06F 17/3028* (2013.01);
(Continued)

(58) Field of Classification Search
CPC ....... G06T 15/506; G06T 15/50; G06T 15/80; G06T 7/0083; G06T 7/0085
(Continued)

(56) References Cited

U.S. PATENT DOCUMENTS 5,835,639 A * 11/1998 Honsinger et al. ............ 382/278
6,850,274 B1 * 2/2005 Silverbrook et al. ......... 348/239
(Continued)

FOREIGN PATENT DOCUMENTS

| CN | 1781124 | 5/2006 |
|---|---|---|
| CN | 1961339 | 5/2007 |
| WO | WO2005122096 | 12/2005 |

OTHER PUBLICATIONS

Russ, John C., "Photoshop for Digital Photographers: Part 5: Working With Edges in Photoshop", Oct. 13, 2004, Graphics.com, pp. 1-8, [retrieved on Jul. 26, 2016]. Retrieved from the Internet <URL: http://www.graphics.com/article-old/part-5-working-edges>.*

(Continued)

*Primary Examiner* — Jacinta M Crawford
*Assistant Examiner* — Terrell Robinson
(74) *Attorney, Agent, or Firm* — Michael A. Glenn; Perkins Coie LLP

(57) ABSTRACT

Limitations of conventional dimensional printing techniques are addressed to provide features and flexibility not presently available, including extracting images selectively from a Postscript® or PDF file and thus enable texturing of individual images within a page; constructing the texture automatically directly from the image using image processing techniques; visualizing the texture to be applied to an image via construction of a bump map or normal map in openGL and DirectX®; adjusting texturing parameters via visual feedback in openGL and DirectX®; and inserting a clear texture back into a PDF file for printing automatically.

29 Claims, 23 Drawing Sheets

(51) Int. Cl.
*G06T 11/00* (2006.01)
*G06F 3/12* (2006.01)
*G06F 17/30* (2006.01)

(52) U.S. Cl.
CPC ............ *G06T 11/001* (2013.01); *G06T 15/04* (2013.01); *G06T 15/506* (2013.01)

(58) Field of Classification Search
USPC ........................................................ 345/426
See application file for complete search history.

(56) References Cited

U.S. PATENT DOCUMENTS

| | | | |
|---|---|---|---|
| 7,199,801 | B2 | 4/2007 | Tsunashima et al. |
| 7,468,820 | B2* | 12/2008 | Ng et al. ................. 358/518 |
| 2003/0053138 | A1 | 3/2003 | Klein et al. |
| 2010/0134811 | A1* | 6/2010 | Fukasawa et al. ............ 358/1.9 |
| 2010/0194991 | A1* | 8/2010 | Kim et al. ................. 348/655 |
| 2011/0012929 | A1 | 1/2011 | Grosz et al. |

OTHER PUBLICATIONS

"07 PhotoShop Filters", Nov. 18, 2004, Webasp, Chapter 7, pp. 1-11, [retrieved on Feb. 3, 2017], Retrieved from Internet <URL:http://www.webwasp.co.uk/lessons/photoshop/07-Filters/07-filters.htm>.*

"Chapter 8. Bump Mapping", The Cg Tutorial; retrieved online from url: http://http.developer.nvidia.com/CgTutorial/cg_tutorial_chapter08.html, Nov. 2007, 39 pages.

"Creative and File Preparation Guidelines", Kodak NexPress Dimensions Printing System; retrieved online from url: http://graphics.kodak.com/KodakGCG/uploadedFiles/Creative_File_Prep_218_Final_010709.pdf, Jan. 2009, 16 pages.

"Forensic Image Comparator3D—Tutor 3. Fingerprint images comparison. Latent Fingerprint Examination.", ScienceGL; retrieved on May 10, 2013 from url: http://www.sciencegl.com/pdf/Tutor_3D_forensic_fingerprint.pdf; 2005, copyright 2003-2005, 12 pages.

Creative and File Preparation Guidelines Kodak NexPress Dimensional Printing System, web.archive.org, graphics.kodak.com, Retrieved from the Internet on Apr. 27, 2016: https://web.archive.org/web/20101116150213.http://graphics.kodak.com/KodakGCG/uploadedFiles/Creative_File_Prep_218_Final_010709.pdf, Nov. 16, 2010, 16 pages.

Blinn, J. F., Simulation of Wrinkled Surfaces, Computer Graphics Proceedings. Annual Conference Series. Siggraph vol. 12, No. 3, Aug. 1978, pp. 286-292.

Way, P T. et al., Automatic Visual to Tactile Translation—Part I: Human Factors, Access Methods, and Image Manipulation, IEEE Transactions on Rehabilitation Engineering, IEEE Inc. New York, vol. 5, No. 1., Mar. 1, 1997, pp. 81-94.

* cited by examiner

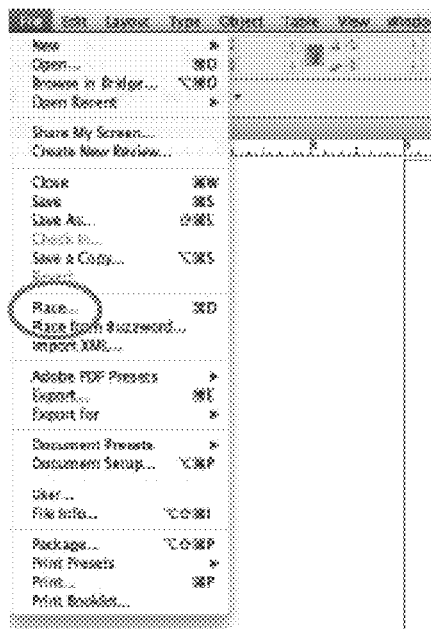
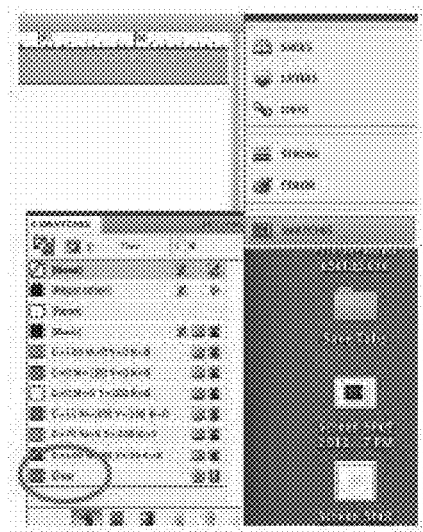
FIGURE 14
FIGURE 15

METHOD AND APPARATUS FOR CREATING A DIMENSIONAL LAYER FOR AN IMAGE FILE

CROSS REFERENCE TO RELATED APPLICATIONS

This application claims priority to U.S. provisional patent application Ser. No. 61/612,842, filed Mar. 19, 2012, which document is incorporated herein in its entirety by this reference thereto.

BACKGROUND OF THE INVENTION

Technical Field

The invention relates to printing. More particularly, the invention relates to a method and apparatus for dimensional printing.

Description of the Background Art

Dimensional Printing imparts a three-dimensional component to printing. See, for example, Kodak NexPress Dimensional Printing System, Creative and File Preparation Guidelines, at http://graphics.kodak.com/KodakGCG/uploadedFiles/Creative_File_Prep_218_Final_010709.pdf. Dimensional printing uses a dimensional clear dry ink to create a clear, raised layer on top of a page element after fusing. It can be used to enhance graphics, text, or a full color image. The overall tactile effect of such ink is similar to thermography, but with a greater degree of control. Dimensional printing can be set to produce variable heights, and thereby more closely mimic the texture of a specific image. Unlike thermography, which can only be applied to ink, dimensional clear dry Ink does not require ink or an image to adhere to a substrate.

SUMMARY OF THE INVENTION

Limitations of conventional dimensional printing techniques are addressed to provide features and flexibility not presently available, including extracting images selectively from a Postscript® or PDF file and thus enable texturing of individual images within a page; constructing the texture automatically directly from the image using image processing techniques; visualizing the texture to be applied to an image via construction of a bump map or normal map in openGL and DirectX®; adjusting texturing parameters via visual feedback in openGL and DirectX®; and inserting a clear texture back into a PDF file for printing automatically.

BRIEF DESCRIPTION OF THE DRAWINGS

FIG. 14 shows the opening of a new document;
FIG. 15 shows swatch selection for the clear channel.

DETAILED DESCRIPTION OF THE INVENTION

Limitations of conventional dimensional printing techniques are addressed to provide features and flexibility not presently available, including extracting images selectively from a Postscript® or PDF file and thus enable texturing of individual images within a page; constructing the texture automatically directly from the image using image processing techniques; visualizing the texture to be applied to an image via construction of a bump map or normal map in openGL and DirectX®; adjusting texturing parameters via visual feedback in openGL and DirectX®; and inserting a clear texture back into a PDF file for printing automatically.

Image Selection

Figure 1:
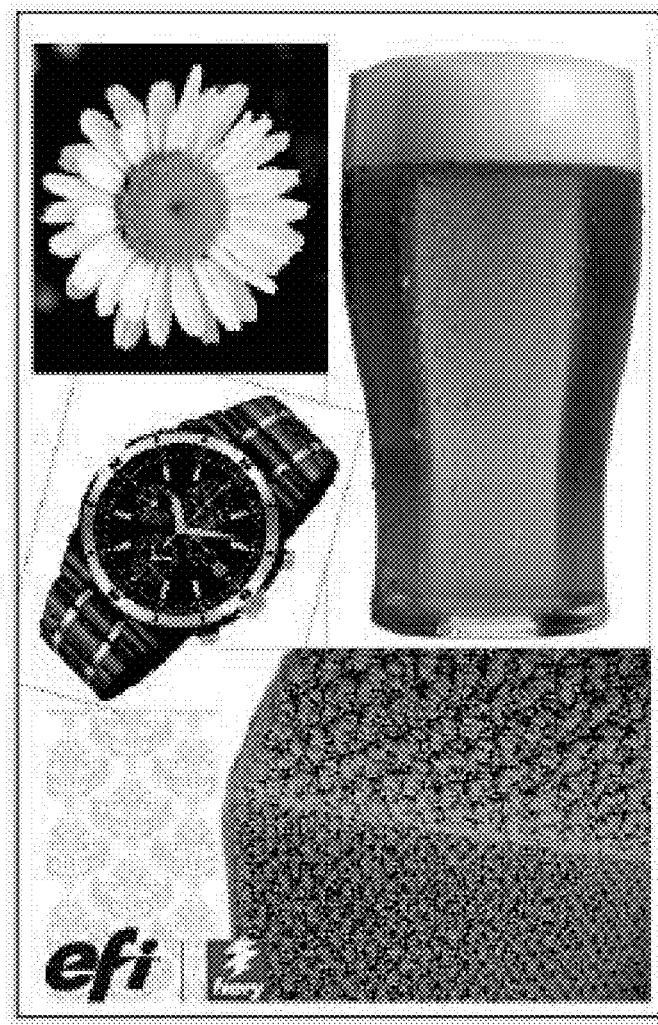
FIG. 1 shows multiple images in a PDF file.
Figure 2:
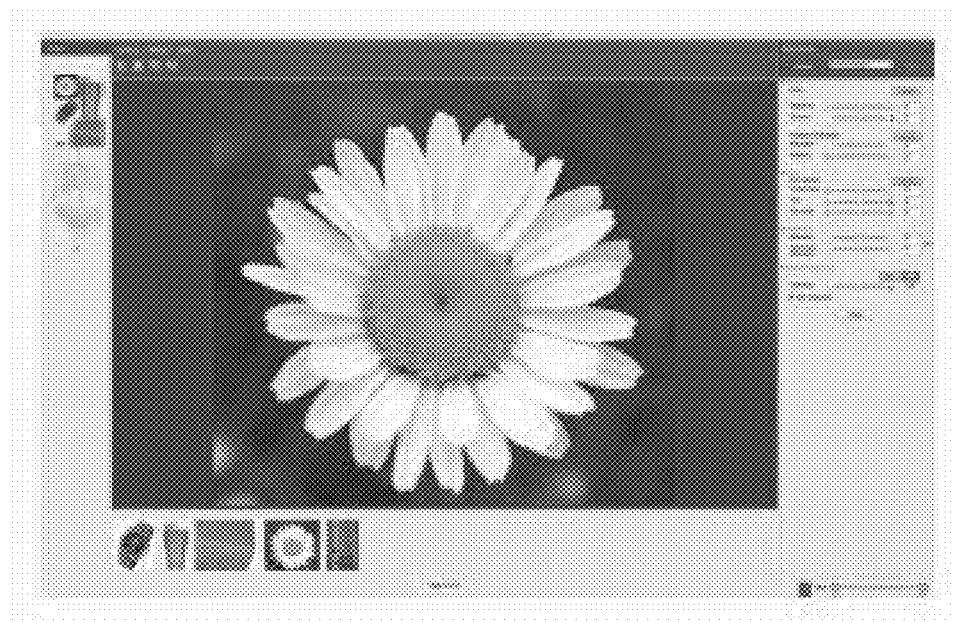
FIG. 2 shows image selection from the PDF file of FIG. 1.

An embodiment of the invention allows individual selection of an image from a PDF file for purposes of dimensional printing. Those skilled in the art will appreciate that the invention is not limited to PDF files and that the invention may be used for with any known file format. In this embodiment, a PDF file (see FIG. 1) is loaded into a texturing application (see FIG. 2). The texturing application enables page selection and selection of an image within page to allow individual control for dimensional printing.

Because the PDF specification is public, there are may code libraries both from Adobe and from third parties that enable one to open, parse, modify, and rewrite PDF files. An embodiment of the invention uses an EFI (Foster City, Calif.) library to open and parse the number of pages in the PDF file, although the skilled person will appreciate that any known library may be used for this purpose. The number of images on each page is then parsed. Note that some PDF creators, i.e. software packages that convert other file formats, such as MS Word, to PDF format save images in strips or tiles. A strip or tile is a subsection of a complete image placed on the page adjacent to other tiles or strips. Based on the size and location of these tiles or strips, they are combined into a single full image for glossing and enhancement using heuristic algorithms. Once all of the images are located, the PDF library displays a thumbnail of each page in the left panel of the display (see FIG. 24A) by ripping that entire page. The PDF library can then extract image data from the PDF for each image to enable it to be displayed individually in the bottom panel of the display (see FIG. 24A).

Generation of a Dimensional Layer

Figure 3:
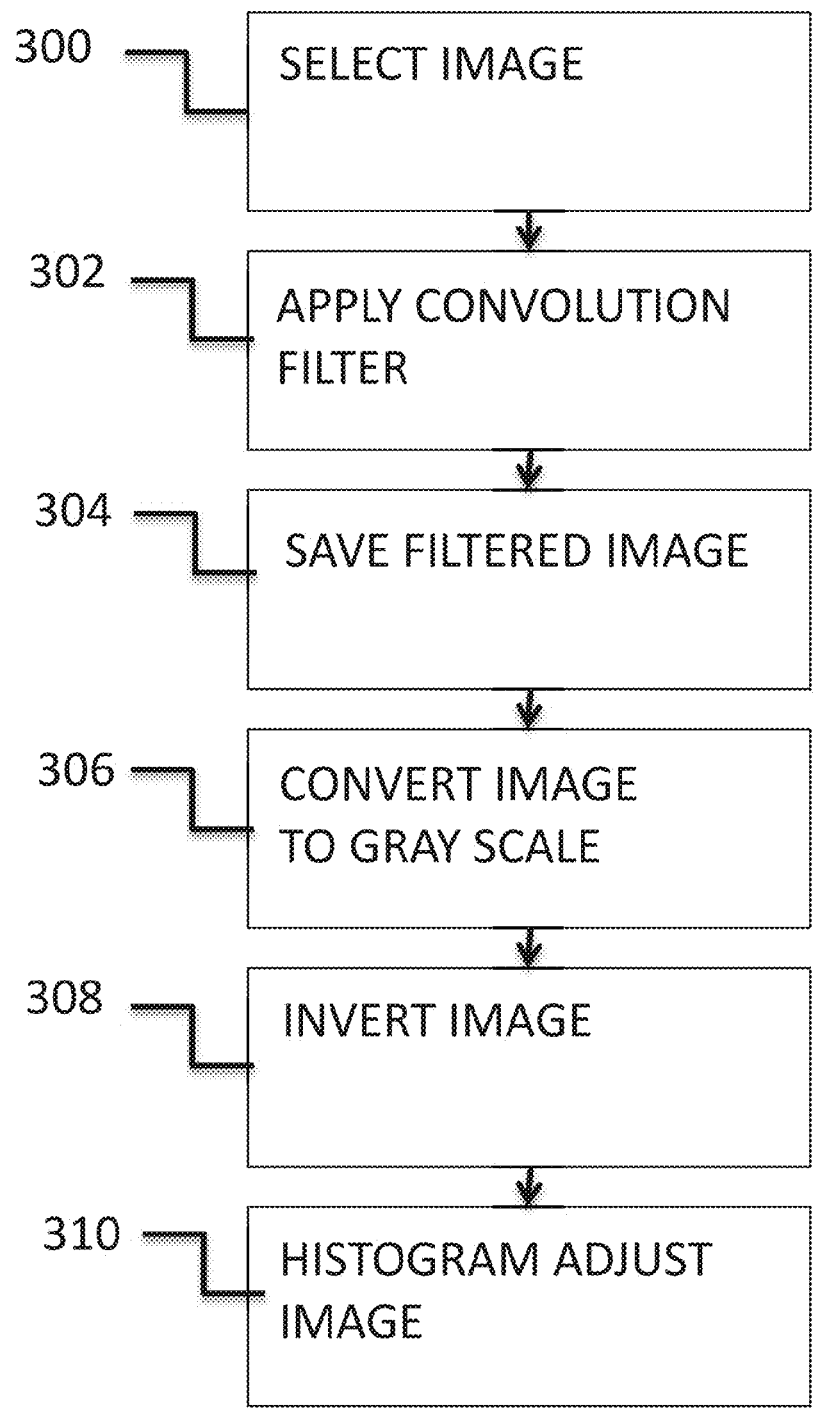
FIG. 3 is a flow diagram showing generation of a dimensional layer according to the invention.

Key to the invention is the generation of a dimensional layer. FIG. 3 is a flow diagram that sets forth the various steps in generating the dimensional layer.

Figure 4:
FIG. 4 shows a selected image from the PDF file of FIG. 1.
Figure 5:
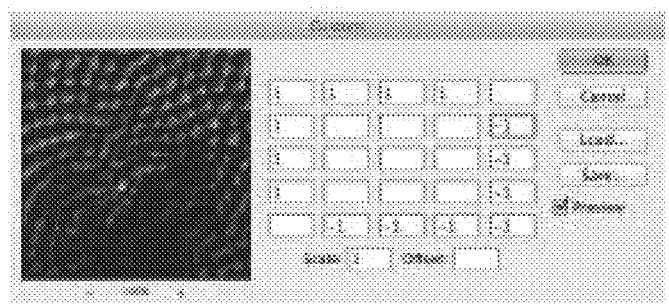
FIG. 5 shows the application of a convolution filter to the image of FIG. 4.
Figure 6:
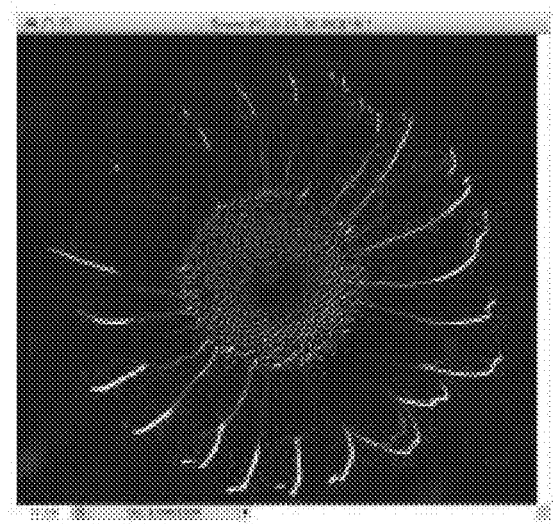
FIG. 6 shows the image of FIG. 4 after filtering.
Figure 7:
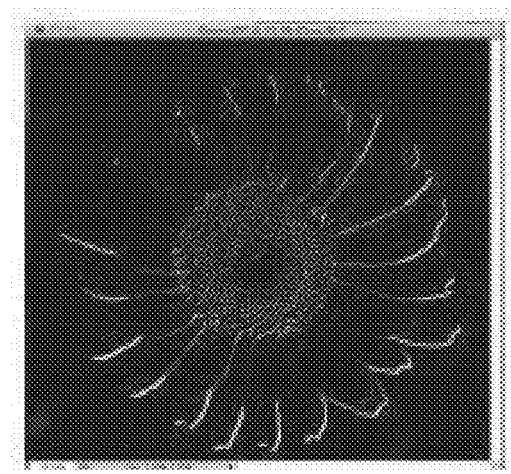
FIG. 7 shows the image of FIG. 4 after conversion to gray scale.
Figure 8:
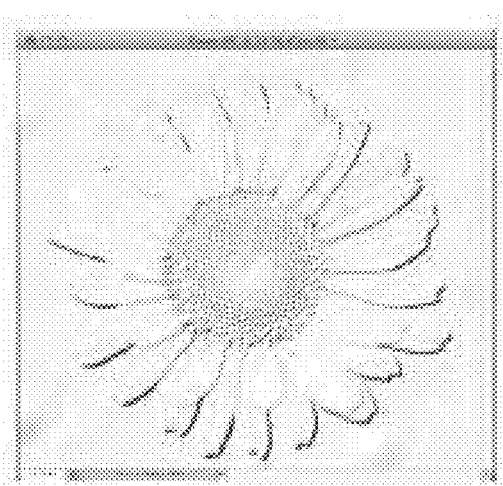
FIG. 8 shows the image of FIG. 4 after inversion.
Figure 9:
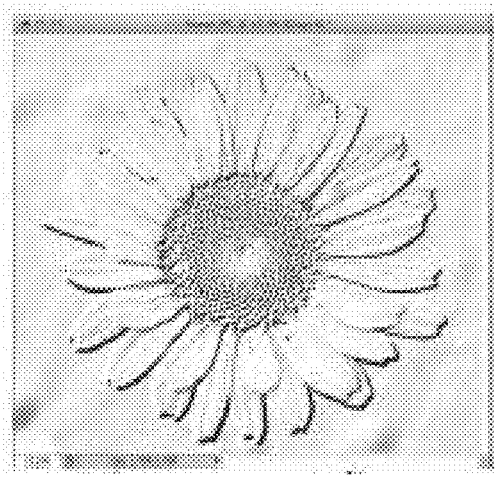
FIG. 9 shows the image of FIG. 4 after histogram adjustment.

Starting with selected image (300) (see FIG. 4), apply a convolution filter to the image (302) to extract edges. FIG. 5 shows an example filter. The filter used is much like an embossing filter (see http://en.wikipedia.org/wiki/Image_embossing), where positive/negative edges are amplified and flat/constant areas are suppressed, although those skilled in the art will appreciate that many other filters may be used in connection with the invention herein. Convert the filtered image (304) (FIG. 6) to gray scale (306) (FIG. 7), invert the image (308) (FIG. 8) and perform a histogram adjustment (310) (FIG. 9). In an embodiment, one useful adjustment concerns stretching the histogram (see http://diwww.epfl.ch/w3lami/detec/perrigproj96/img22.gif) so that approximately 10% of the image's pixels are marked (in the referenced picture, non-white). This limits the amount of clear ink used and insures that significant regions of the image have the dimensional effect.

Apply the Dimensional Layer to the PDF File

Figure 10:
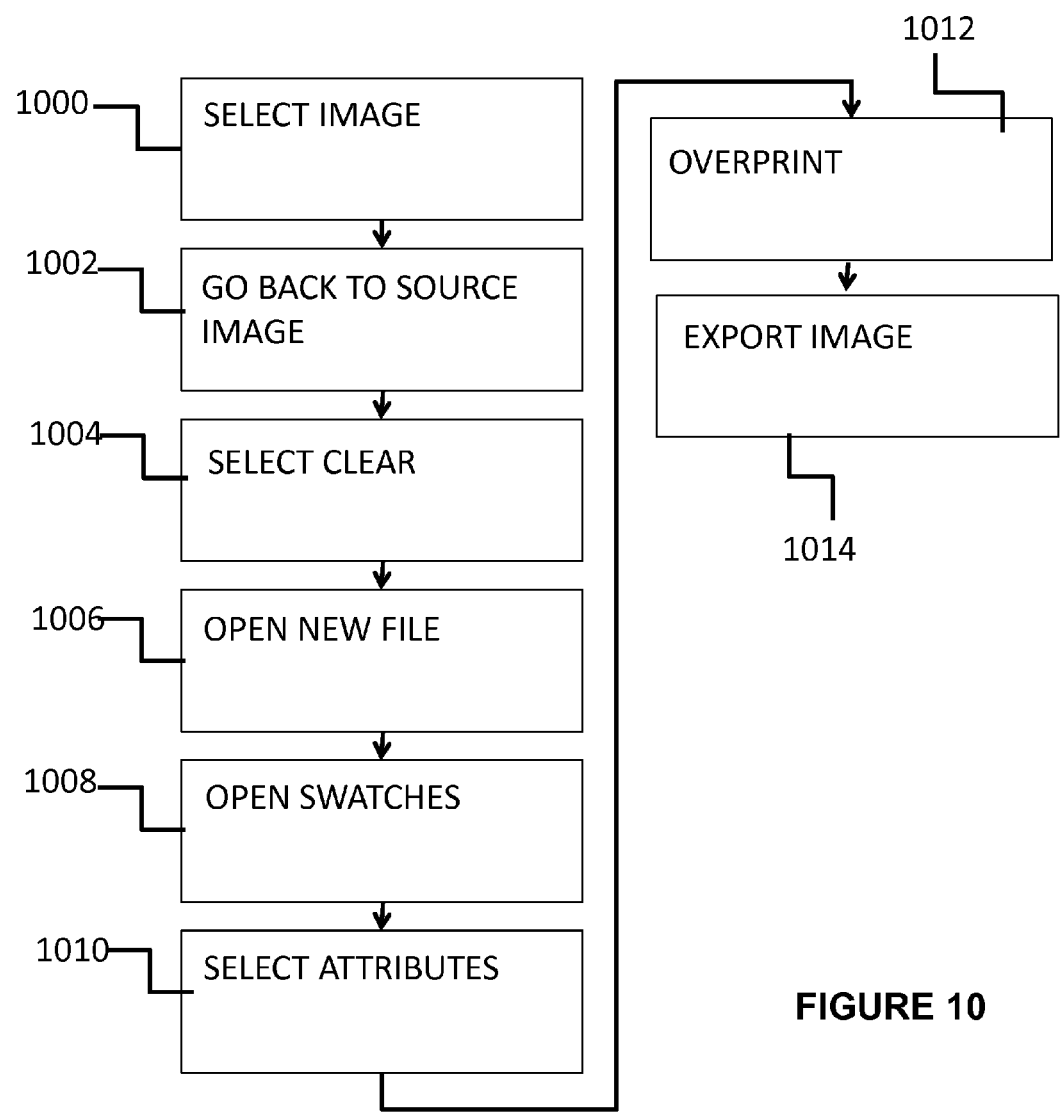
FIG. 10 is a flow diagram showing the application of a dimensional layer to a PDF file according to the invention.

FIG. 10 is a flow diagram that shows the steps in applying the dimensional layer to a PDF file. FIGS. 11-18 show how the dimensional layer is applied to the PDF file in the Adobe InDesign program. The example provided herein is only one of many ways this aspect of the invention may be implemented, as would be known to those skilled in the art. For example, in other embodiments of the invention, this procedure is performed programmatically in a texturing application. Once the clear layer of the image is calculated, it is inserted back into the PDF file as a supplementary image using clear ink, i.e. a named spot color, to be printed over existing RGB or CMYK image. Those skilled in the art will appreciate that, while a presently preferred embodiment of the invention comprehends the use of a clear layer as the dimensional layer, any one or more of the image color channels, e.g. any one or more of the C, M, Y, and K channels, may be treated as a dimensional layer in addition to, or instead of, the clear channel.

Figure 11:
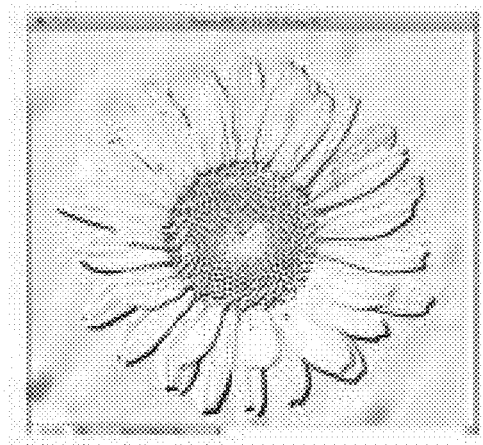
FIG. 11 copying of the histogram adjusted image.
Figure 12:
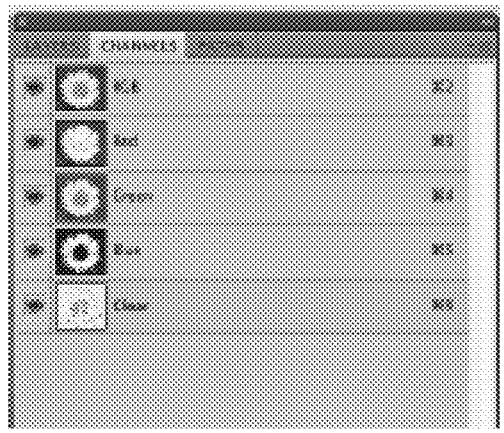
FIG. 12 shows selection of a clear layer.
Figure 13:
FIG. 13 shows the image with a clear channel.
Figure 16:
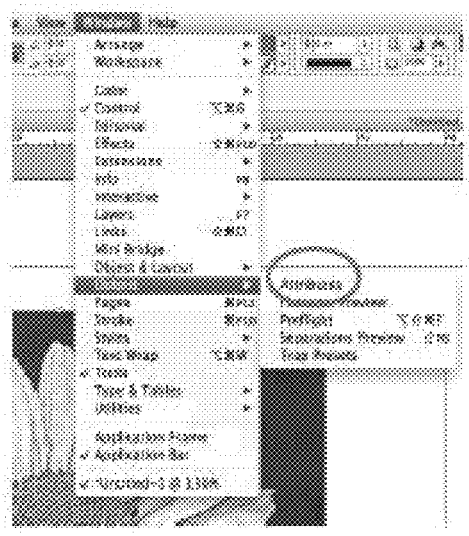
FIG. 16 shows opening of the attributes window.
Figure 17:
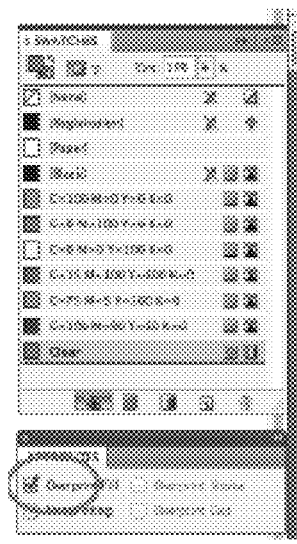
FIG. 17 shows selection of the overprint file swatch.
Figure 18:
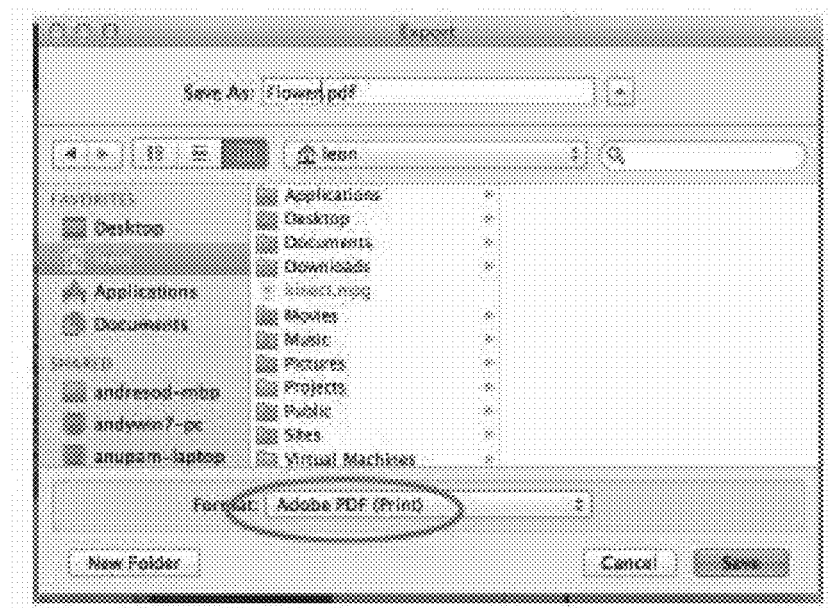
FIG. 18 shows export of the file as a PDF file.

This first step in applying the dimensional layer to a PDF file is to Select All and copy (Ctrl-C) Histogram adjusted image (1000) (see FIG. 11). The user then goes back to original RGB image and selects clear layer Paste (1002) (see FIG. 12). In some embodiments, the use of repeated undo's returns to RGB image quickly. The image now has a clear Spot channel dimension (shown as G+Clear). The image is saved in this example as flower.psd (1004) (see FIG. 13). A new InDesign document is opened and Place is selected (1006) (see FIG. 14). Swatches is opened and "clear channel" is selected (1008) (see FIG. 15). Attributes Windows is then opened (1010) (see FIG. 16). With the clear swatch selected, check Overprint Fill (1012) (see FIG. 17). The file is then exported from InDesign as a PDF (1014) (see FIG. 18). In this embodiment, it is important to make sure that the format is Adobe PDF (print).

The purpose of the foregoing is to overprint the new clear separation on top of the existing RGB or CMYK image. The discussion above describes how to accomplish this using an Adobe application. In an embodiment that employs EFI's texturing application, the clear overprint image is inserted programmatically using EFI's PDF library.

Visualization of Texturing

Figure 19:
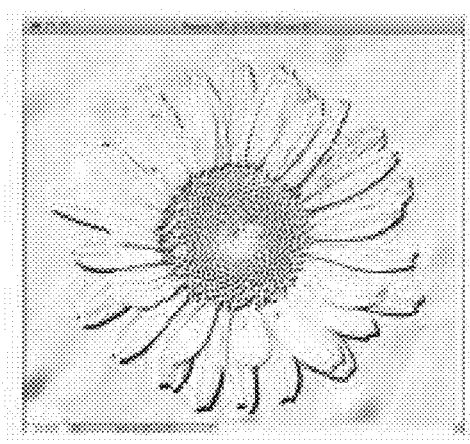
FIG. 19 shows the image with a normal map.
Figure 20:
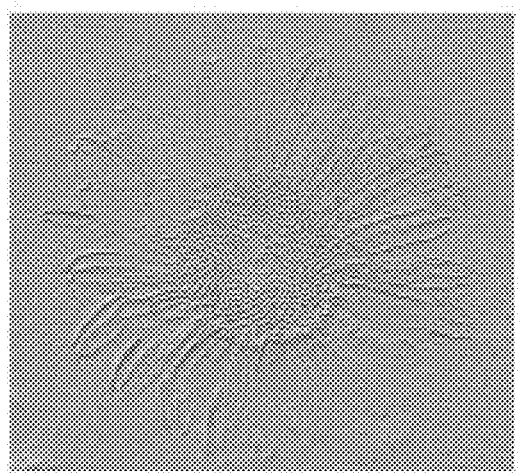
FIG. 20 shows a bump map for the image.

Embodiments of the invention concern generation of a normal map (FIG. 19) or bump map (FIG. 20) using techniques such as are described, for example, at Cg Tutorial, Chapter 8. Bump Mapping, http.developer.nvidia.com/Cg-Tutorial/cgtutorial_chapter08.html.

Figure 21:
FIG. 21 shows the image without the bump map.
Figure 22:
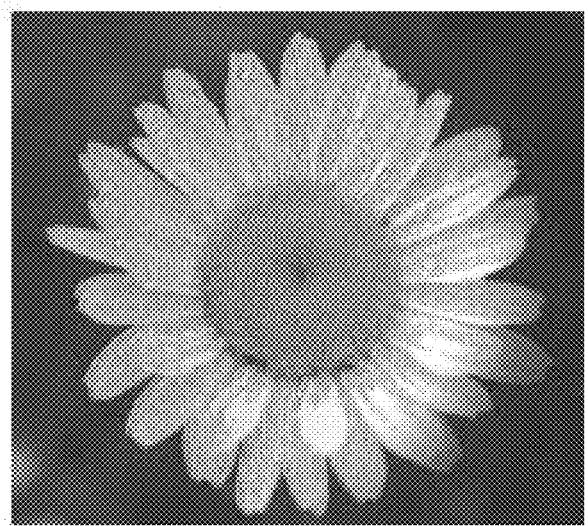
FIG. 22 shows the image with a bump map applied.

FIG. 21 shows an image, such as that processed in accordance with the steps of FIGS. 3 and 10, without bump map. FIG. 22 shows image displayed with a bump map. When the image with bump map is displayed in a texturing application, user adjustable settings, such as depth, amount, and filter can be varied and the result is seen in the application window.

Visualization with bump mapping simulates how light interacts with the created overprinted clear layer. It does this by adjusting the surface normal of the image. A surface normal is a vector that is perpendicular to the image plane. Where no clear ink is added, the controlling bump map does not modify the surface normal, or normal, and it remains unchanged. At the edge of a region where clear ink is added, the controlling bump map modifies the normal to be perpendicular to change of height of the image with the clear. A lighting simulation in which computed reflected light is controlled by the normal highlights, or increases luminance, of regions where the normal is directed toward the observer. Likewise, regions where the normal is directed away from the observer has decreased luminance. The observer sees highlights and shadows added to the image that simulate a three-dimensional effect at the edge of the clear layer as shown in FIGS. 24c and 24e. The depth control is used to control the thickness of the clear layer applied by the printer and the corresponding height of the bump map visualization. The amount control is used to set how much of the image is covered with clear ink and appropriately visualized in the bump map simulation. The filter control (smoothness control) is used to adjust the sensitivity of the filter to edges detected in the image. Increasing smoothness removes clear ink from small, high frequency edges while decreasing it increases clear ink on small, fine detail.

Saving the PDF File for Printing

Figure 23:
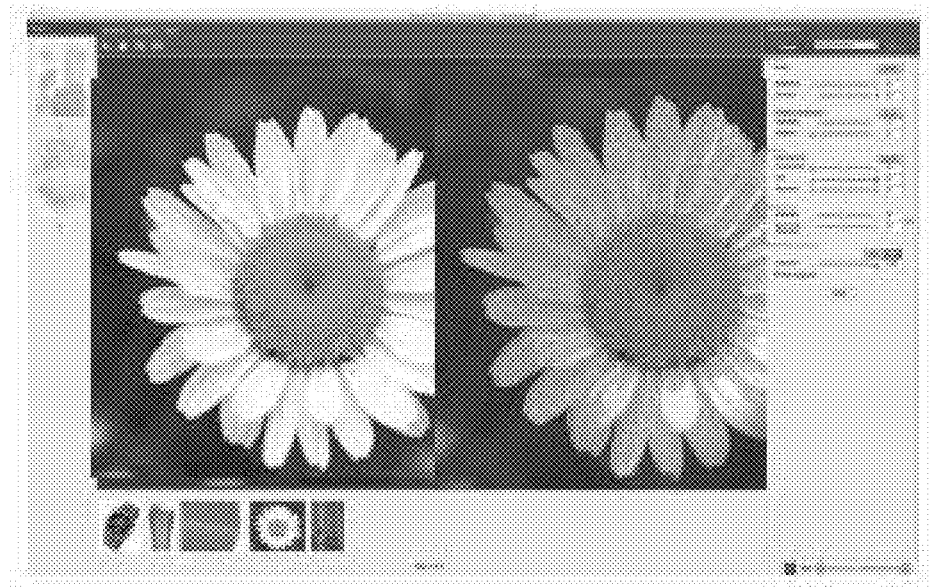
FIG. 23 processed image saved for printing.

Once the user is satisfied with the texturing result and all images have been textured as desired, the PDF file with the additional ink/clear toner layer is saved for printing with the appropriate settings for dimensional printing on the desired printer (FIG. 23).

Visual Editor

FIGS. 24A-24J are screen shots that show a visual editor for dimensional printing according to the invention.

Figure 24A:
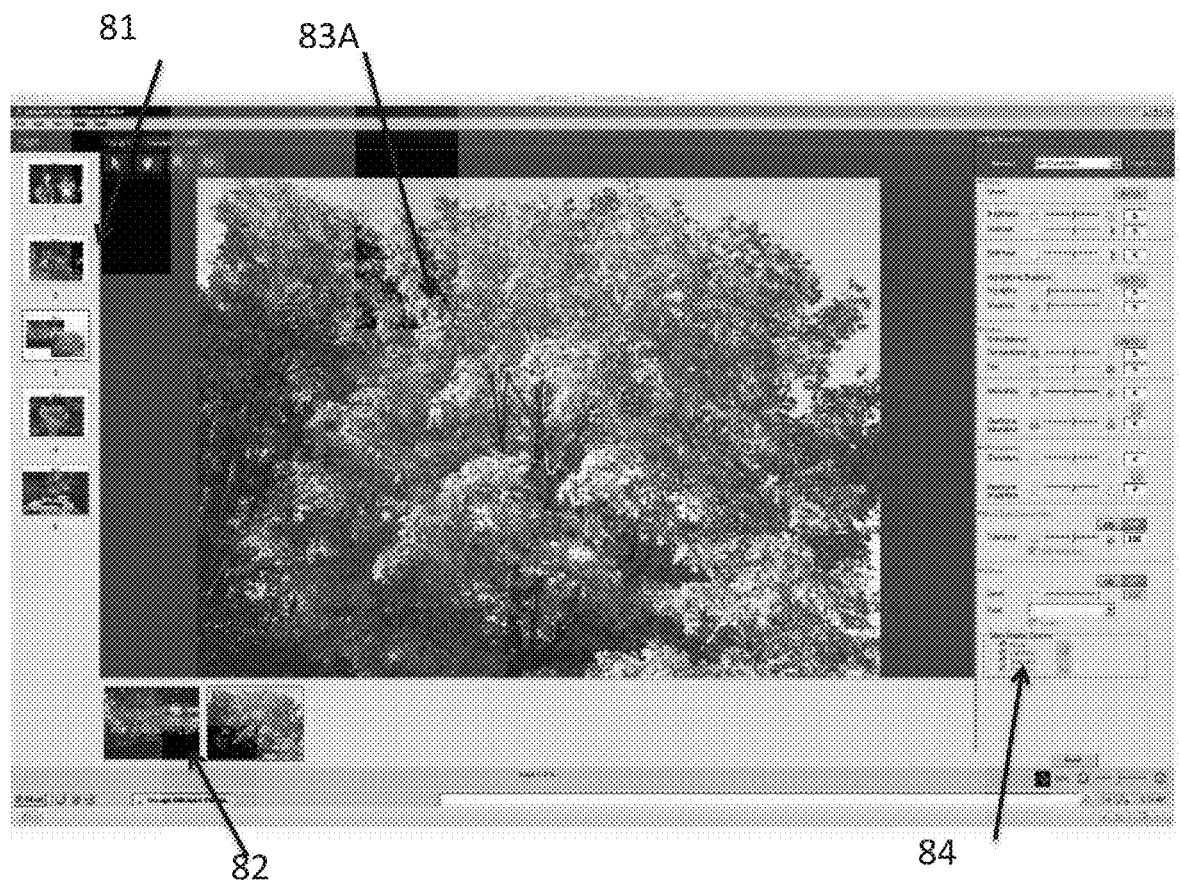
FIGS. 24A-24J are screen shots that show a visual editor for dimensional printing according to the invention.

FIG. 24A is a screen shot of an image-enhanced visual editor which, in a preferred embodiment, not only enhances images but also adds a dimensional printing channel. The user accesses this feature of the invention via a menu that allows the user to open a PDF file. After the user selects a desired PDF file, a thumbprint of the file is displayed on the left-hand side 81 of the user's screen for each of the pages that the PDF file contains. Once these pages are available, the user can select a given page.

At the bottom pane 82, each one of the individual images that appear on a selected page is displayed. The user selects a desired image and the image 83A is displayed to the user. An embodiment of the invention provides one or more dimensional printing controls 84. In an embodiment, controls for dimensional printing include, for example:

Level: amount of the image covered by clear ink;

Smoothness (not shown): increases/decreases clear ink on fine details; and

Invert: reverses the clear ink/no clear ink control image.

As discussed above, in an embodiment dimensional printing is achieved by deriving a clear channel specifically from the content of the selected image.

Figure 24B:
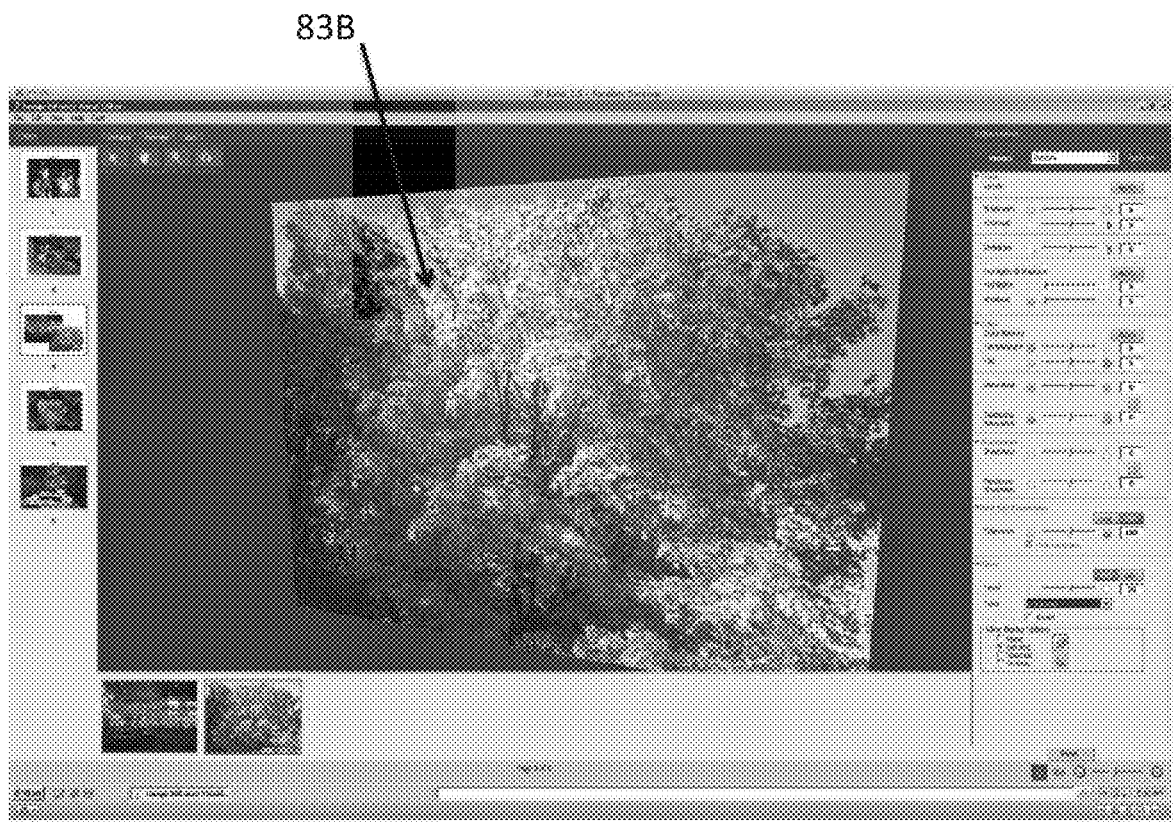
Figure 24C:
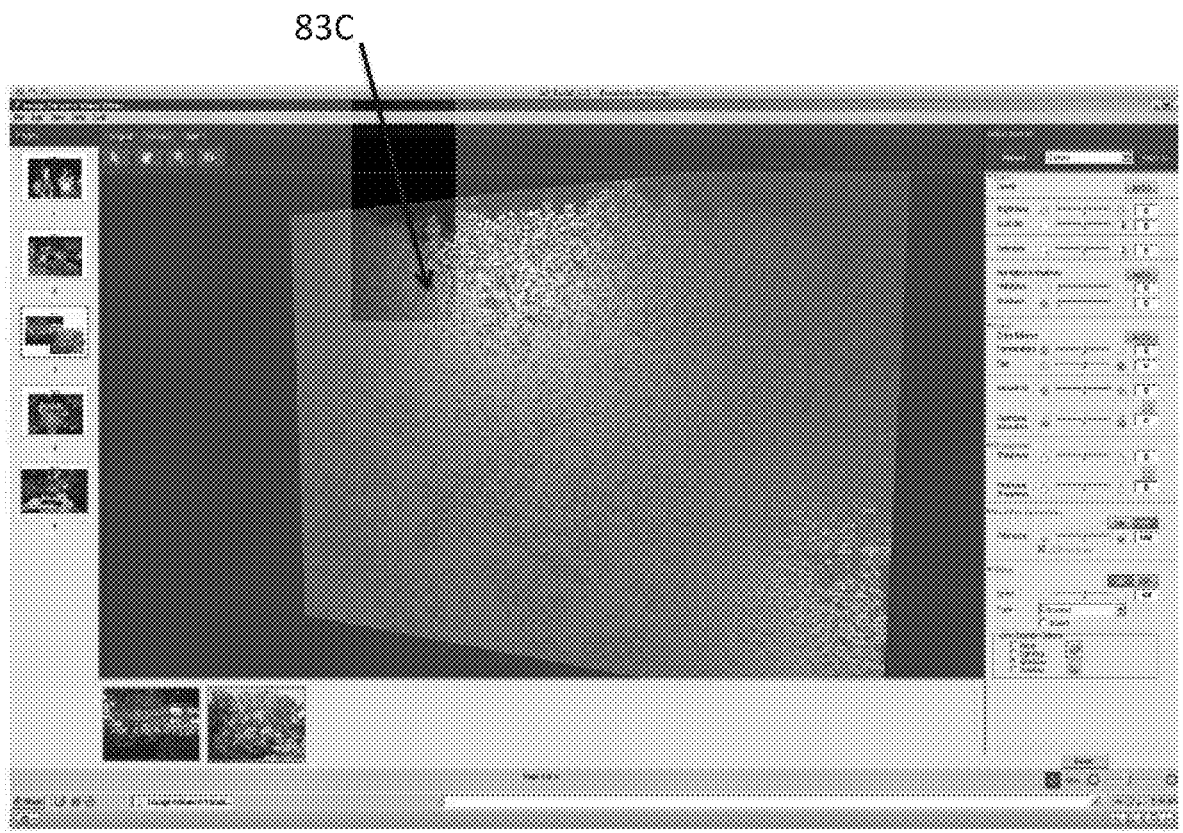

FIG. 24B shows the selected image 83B with the dimensional printing channel and with a lighting simulation in 3-D. The lighting feature (discussed above) is a known feature that, in an embodiment, is supported by the OpenGL/DirectX 3D imaging environments. In FIG. 24B, specular reflection is simulated on the given page by allowing the image to be rotated. The simulation of reflected light allows the user to judge how much texture is applied to the image.

One aspect of the invention concerns the use of specular reflection in conjunction with creating dimensional texture and visualizing its effect and adjusting it before printing.

Texture is one result of dimensional printing. The clear ink increases the texture when applied uniformly. Controlling the thickness of the uniform layer enables some control of the texture. The edges of the clear/no clear ink regions create the texture/dimension.

FIG. 24C is a screen shot that shows only the specular lighting of the image 83C. This allows the user to see the actual amount of texture that is applied to the image.

Figure 24D:
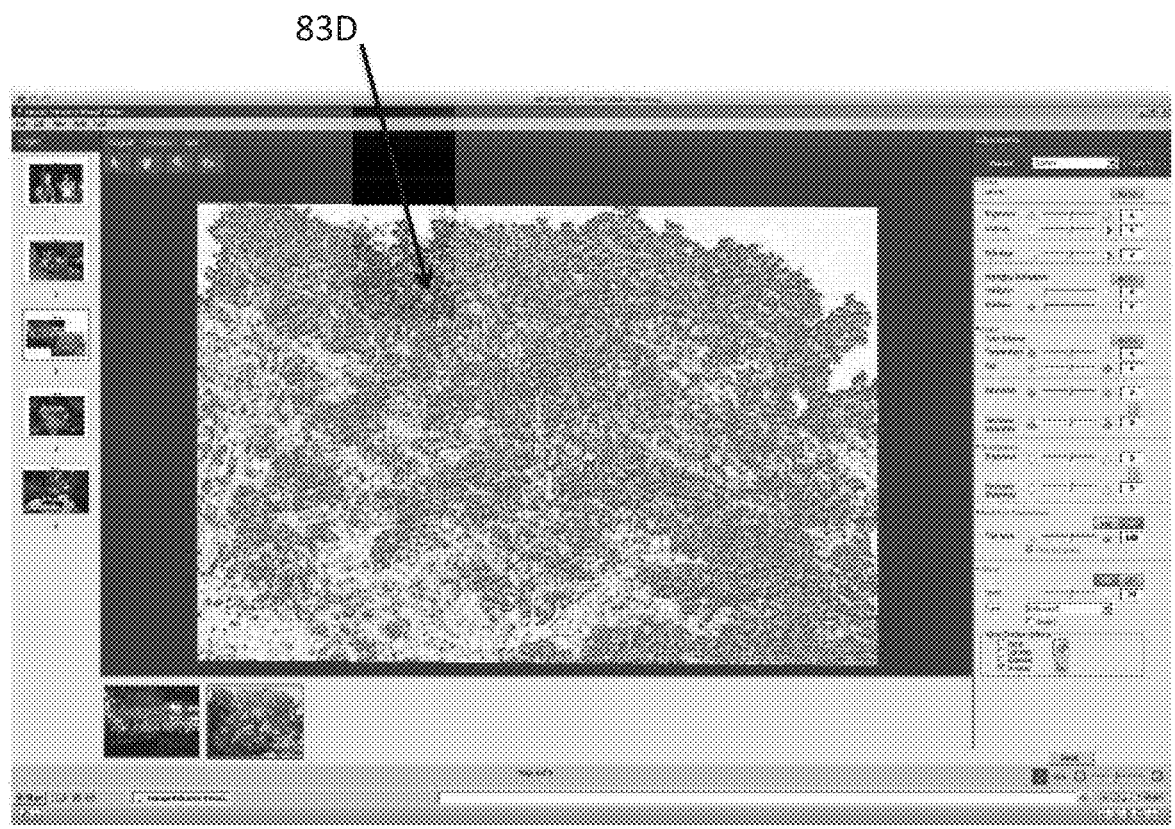
Figure 24E:
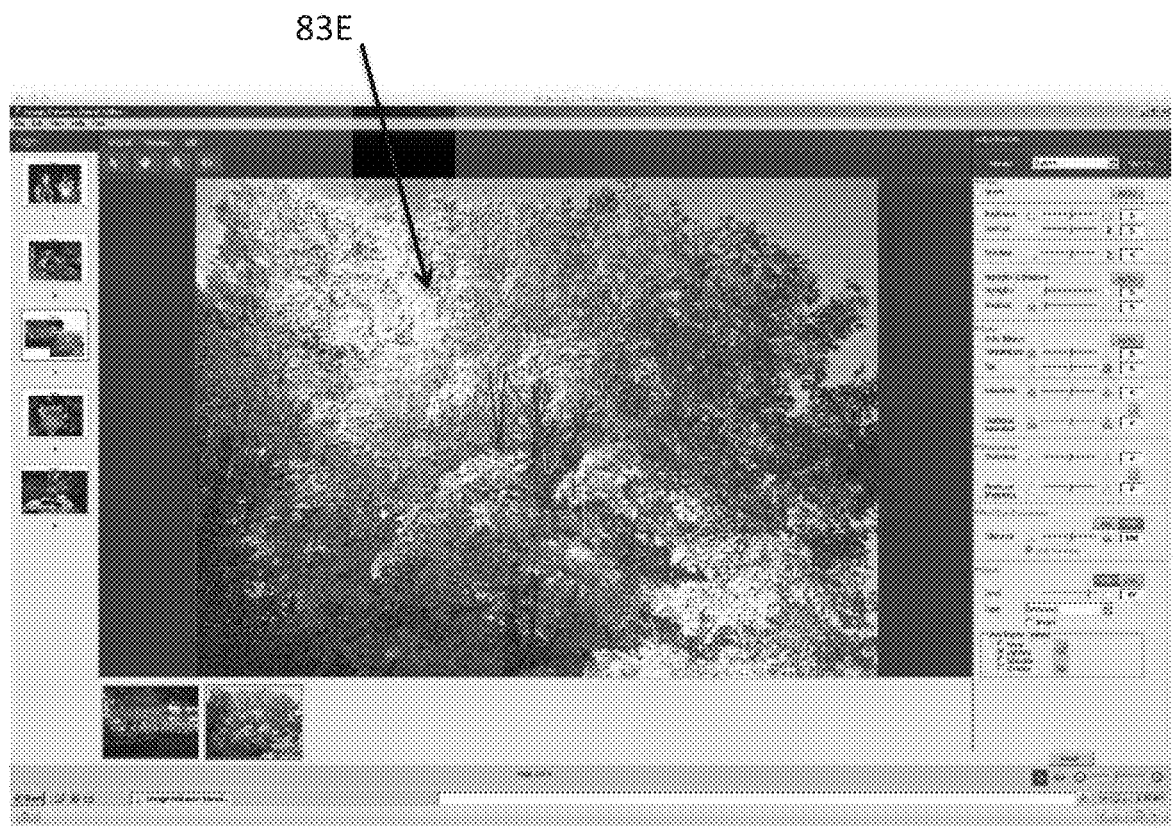

FIG. 24D shows the actual intensity of the dimensional printing channel with regard to the image 83D. This allows the user to inspect the actual grey-level of the clear ink layer applied to each pixel. Thus, the user can see how much clear is applied to the total image and where it is concentrated.

Embodiments of the invention provide several modes with which to visualize the texture applied by the dimensional printing channel. For example, the texture can be increased to its maximum level, as shown by the image 83D in FIG. 24D. In this way, the user can see much more intensity and therefore much more thickness of the texture; or the user can reduce the intensity of the texture down to zero.

In addition to moving the image to simulate the texture, the user can also move the lights, as shown in the image 84E on FIG. 24E. This allows a simulation of what happens as the image is moved around under different lighting conditions.

Figure 24F:
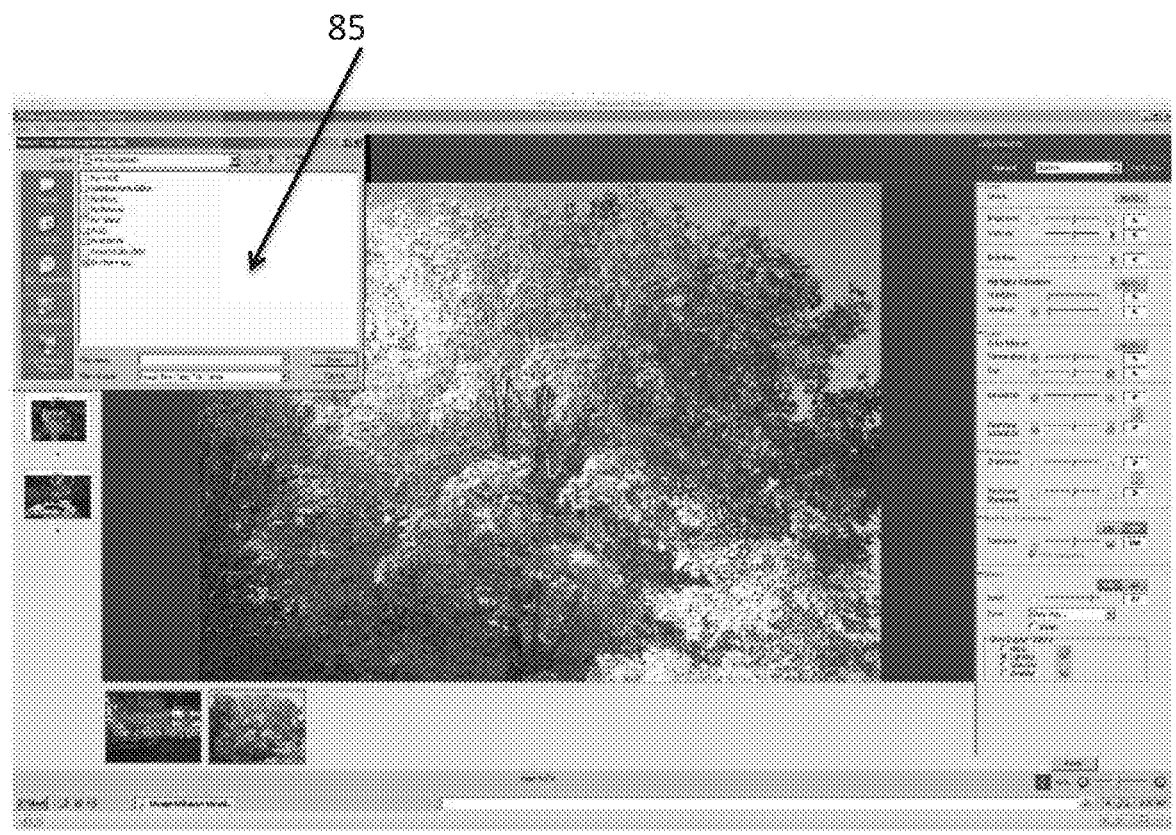
Figure 24G:
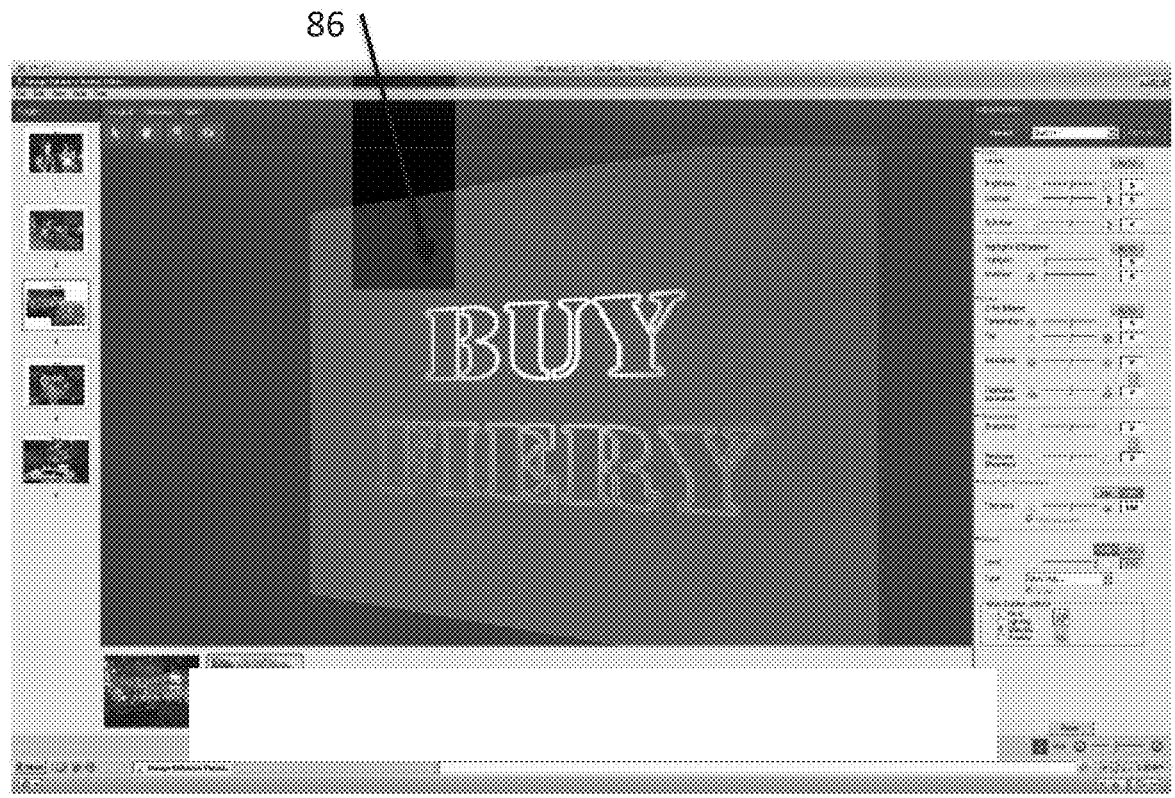
Figure 24H:
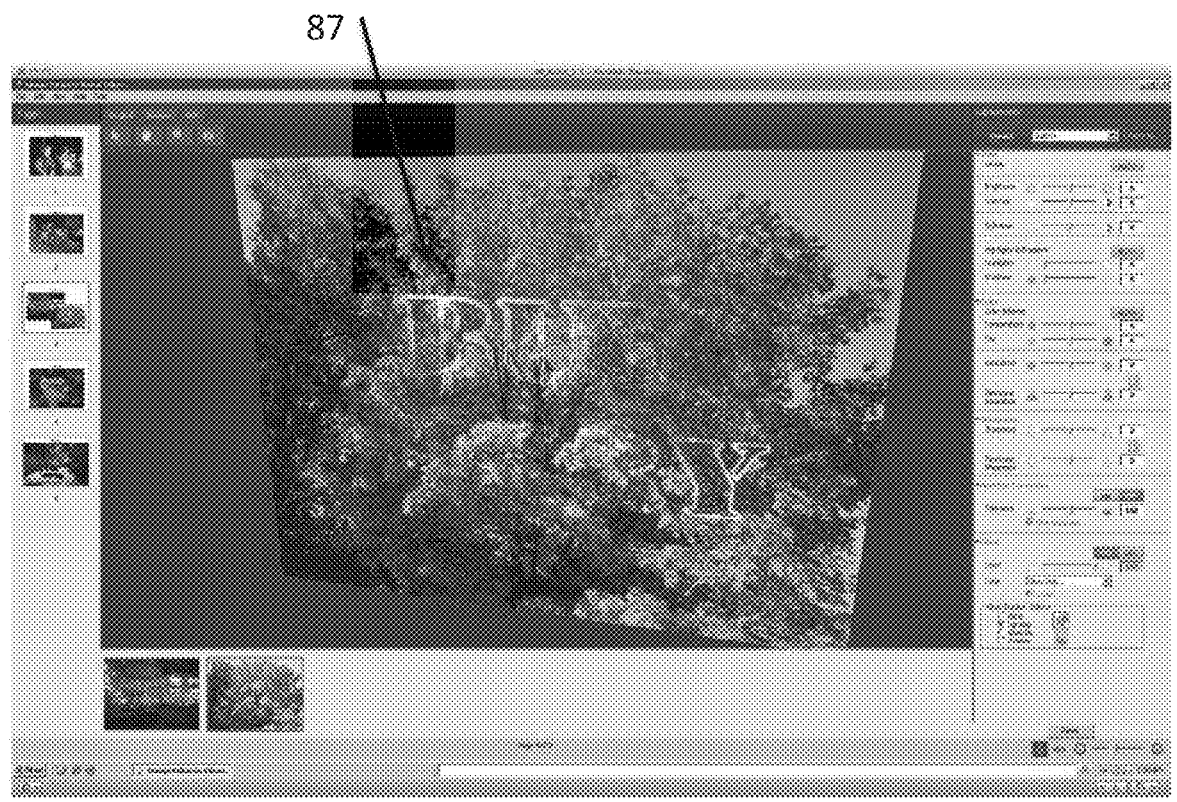
Figure 24I:
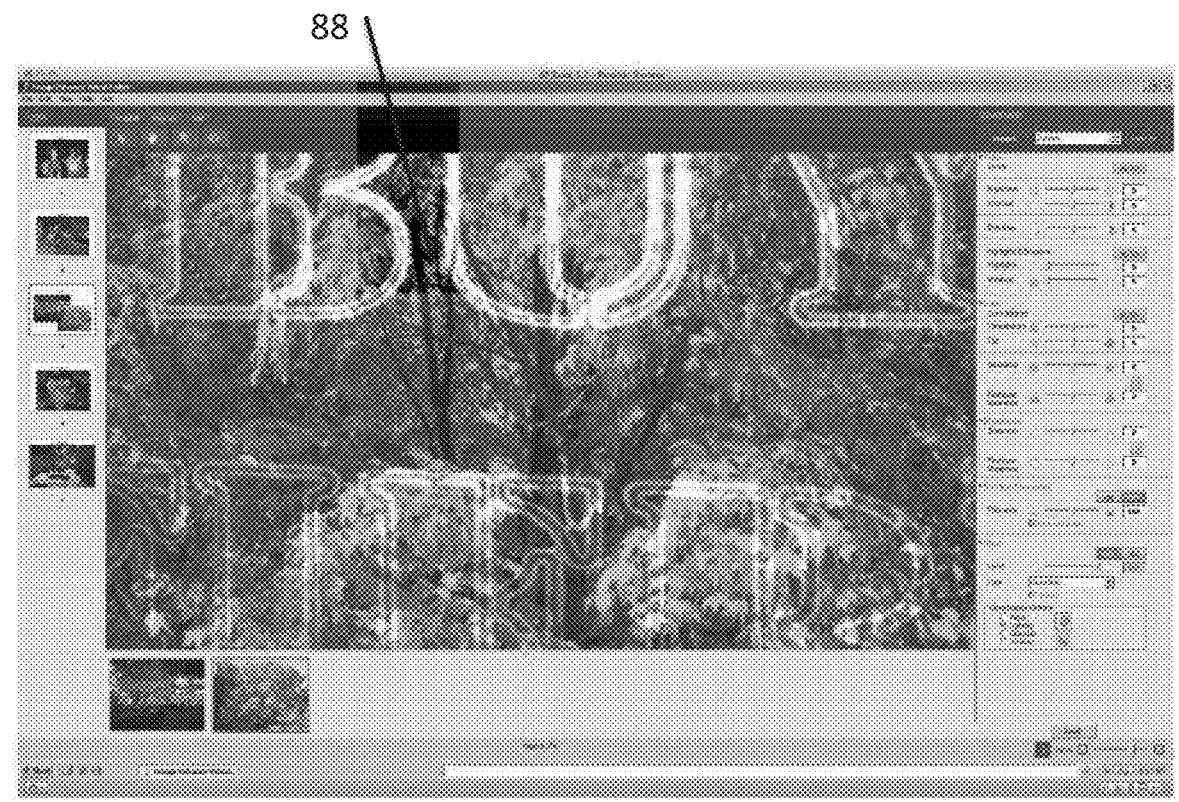
Figure 24J:
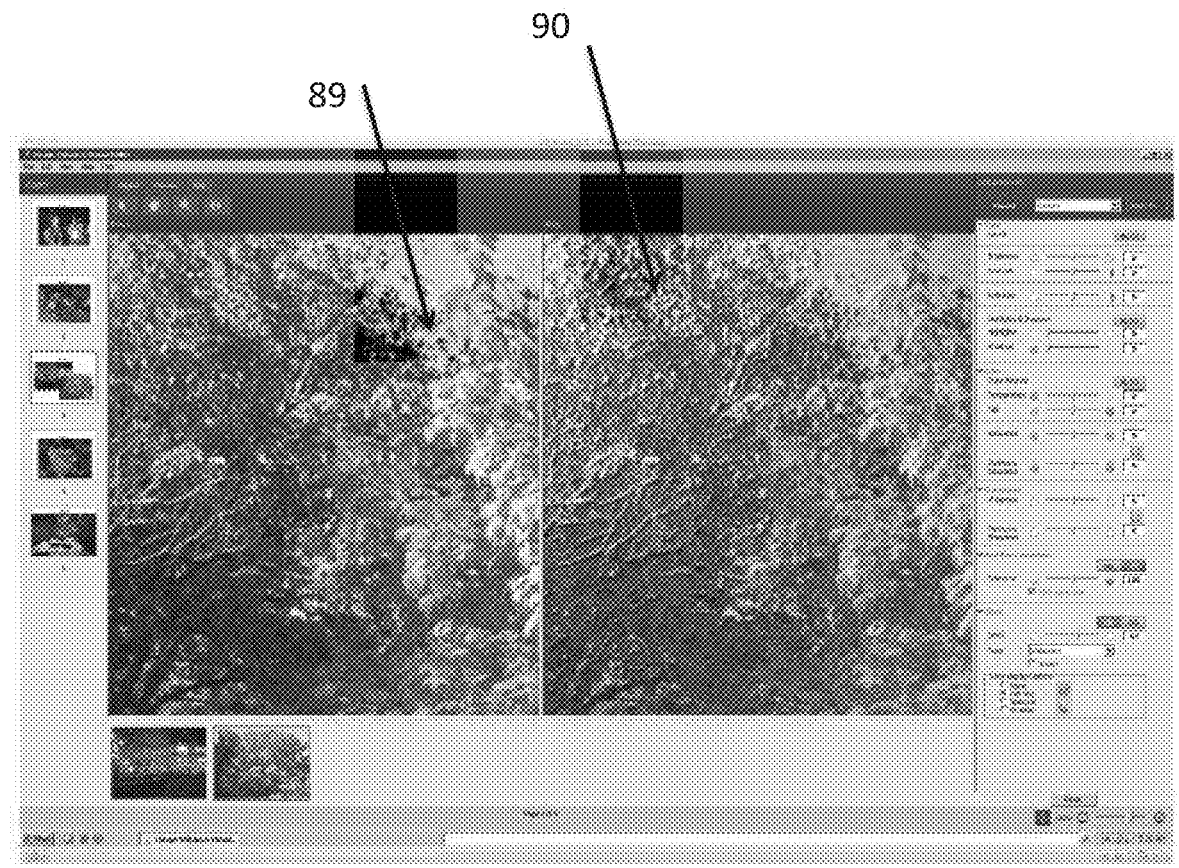

In addition to deriving the dimensional printing channel, the user can access a menu 85 that allows insertion of a dimensional channel map (see FIG. 24F). The dimensional channel map can be any image file with which a specific texture layer 86 is generated (see FIG. 24G). The user can visualize the dimensional channel map using tools to affect the specular simulation or the lighting of the dimensional layer map. The dimensional layer map also responds to any camera movement or illumination. This allows the user to add individual custom features on the dimensional layer channel, as shown in the image 87 on FIG. 24H. In an embodiment, any size image can be scaled to fit the maximum image size. For example, the user can zoom in for a closer look at the dimensional layer channel of the image, as shown in the image 88 on FIG. 24I; or the user can view the image 89 and dimensional layer channel 90 side-by-side (see FIG. 24J).

Computer Implementation

Figure 25:
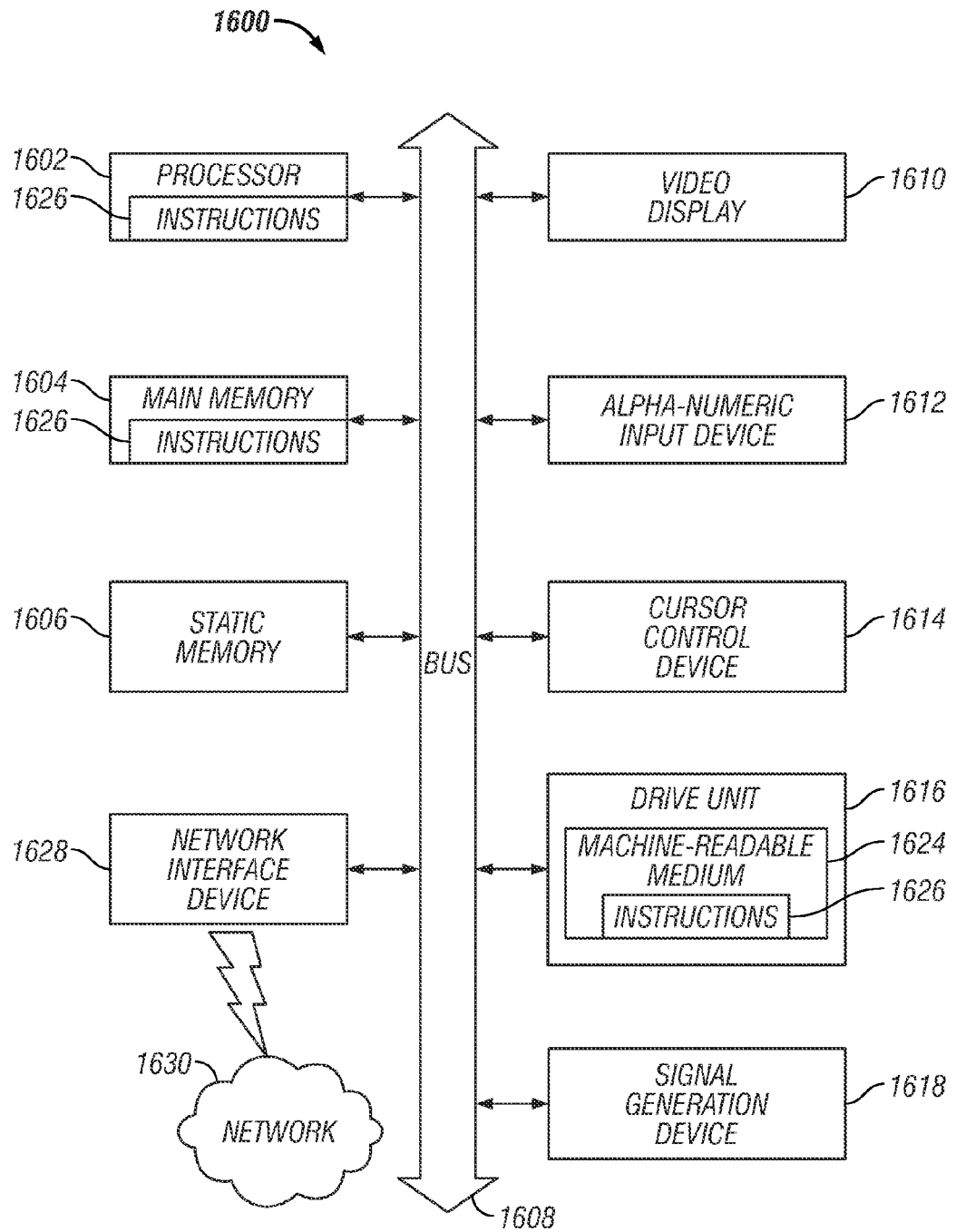
FIG. 25 is a block schematic diagram that depicts a machine in the exemplary form of a computer system within which a set of instructions for causing the machine to perform any of the herein disclosed methodologies may be executed.

FIG. 25 is a block schematic diagram that depicts a machine in the exemplary form of a computer system 1600 within which a set of instructions for causing the machine to perform any of the herein disclosed methodologies may be executed. In alternative embodiments, the machine may comprise or include a network router, a network switch, a network bridge, personal digital assistant (PDA), a cellular telephone, a Web appliance or any machine capable of executing or transmitting a sequence of instructions that specify actions to be taken.

The computer system 1600 includes a processor 1602, a main memory 1604 and a static memory 1606, which communicate with each other via a bus 1608. The computer system 1600 may further include a display unit 1610, for example, a liquid crystal display (LCD) or a cathode ray tube (CRT). The computer system 1600 also includes an alphanumeric input device 1612, for example, a keyboard; a cursor control device 1614, for example, a mouse; a disk drive unit 1616, a signal generation device 1618, for example, a speaker, and a network interface device 1628.

The disk drive unit 1616 includes a machine-readable medium 1624 on which is stored a set of executable instructions, i.e., software, 1626 embodying any one, or all, of the methodologies described herein below. The software 1626 is also shown to reside, completely or at least partially, within the main memory 1604 and/or within the processor 1602. The software 1626 may further be transmitted or received over a network 1630 by means of a network interface device 1628.

In contrast to the system 1600 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complementary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a machine or computer readable medium. A machine-readable medium includes any mechanism for storing or transmitting information in a form readable by a machine, e.g., a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Although the invention is described herein with reference to the preferred embodiment, one skilled in the art will readily appreciate that other applications may be substituted for those set forth herein without departing from the spirit and scope of the present invention.

For example, embodiments of the invention provide for selective dimensionalization of portions of prints. Thus, various creative effects can be achieved, where portions of a print, such as text, are dimensionalized to varying degrees as desired, while other portions of the print remain unaffected. These effects can be achieved at any desired level of granularity, such as page by page in a multipage document, page element by page element within a page, or within a particular page element, for example where a portion of an image is to be highlighted or deemphasized based upon amount of dimensionalization, e.g. by use of the visual editor described above to adjust soft print parameters in the image itself and/or by adjusting the physical parameters of the printer. Further, those skilled in the art will appreciate that the various parameters taught herein for effecting control of dimensionalization can be adjusted as desired alone or in combination.

Accordingly, the invention should only be limited by the Claims included below.

The invention claimed is:

1. A computer implemented method for creating a clear dimensional layer for application to an image within a file, comprising;
   selecting a source image;
   a processor applying a copy of said source image to a dimensional printing channel, and within said dimensional printing channel:
      said processor applying a convolution filter to each pixel in said image to extract edges detected within said image, wherein positive and negative edges are amplified and flat and constant areas are suppressed to simulate texture in three dimensions;
      said processor converting said filtered image to gray scale;
      said processor inverting said image; and
      said processor performing a histogram adjustment of said image to limit the amount of clear ink used by said dimensional printing channel and insure that significant regions of the source image have a dimensional effect, said histogram adjustment further comprising stretching the histogram to mark about 10% of the image's pixels; and
   said processor adding said histogram adjusted image to said source image as a clear dimensional layer.

2. The method of claim 1, further comprising:
   displaying a bump map of said dimensional layer as an intermediate image to enable specular lighting simulation/visualization by modifying a surface normal.

3. The method of claim 1, further comprising:
   providing user adjustable settings comprising any of depth, amount, and filter for adjusting said dimensional layer.

4. The method of claim 1, further comprising:
   providing a visual editor for operating upon said dimensional printing channel in response to user inputs.

5. The method of claim 1, said visual editor further comprising:
   a file, page, and image selection tool for displaying to a user individual images that appear on a selected page.

6. The method of claim 1, said visual editor further comprising:
   at least one dimensional printing control for allowing a user to adjust the intensity of said dimensional layer.

7. The method of claim 1, said processor deriving a clear channel specifically from content of said selected image, said clear channel providing said dimensional printing layer.

8. The method of claim 1, said visual editor further comprising:
   a control for simulating specular reflection on a selected page to allow a user to judge how much texture is applied to the source image.

9. The method of claim 1, said visual editor further comprising:
   a control for moving the histogram adjusted image to simulate texture in three dimensions.

10. The method of claim 1, said visual editor further comprising:
    a control for moving one or more simulated lights to display the image as it is moved around under different lighting conditions.

11. The method of claim 1, said visual editor further comprising:
    a control for insertion of a dimensional printing map, said dimensional printing map comprising an image file with which a specific dimensional printing layer is generated.

12. The method of claim 11, said visual editor further comprising:
    a plurality of tools for adjusting any of specular simulation and lighting of said dimensional printing map; simulating any of camera movement and illumination; scaling any size source image to fit a maximum image size; and providing side-by-side views of said source image and said dimensional printing map.

13. The method of claim 1, wherein said dimensional printing channel comprises any of one or more channels of said source image.

14. An apparatus for creating a dimensional layer for application to an image within a file, comprising;
    a processor applying a copy of a selected source image to a dimensional printing channel, and within said dimensional printing channel:
       said processor applying a convolution filter to each pixel in said image to extract edges within said image, wherein positive and negative edges are amplified and flat and constant areas are suppressed to simulate texture in three dimensions;
       said processor converting said filtered image to gray scale;
       said processor inverting said image; and
       said processor performing a histogram adjustment of said image to limit the amount of clear ink used by said dimensional printing channel and insure that significant regions of the source image have a dimensional effect, said histogram adjustment comprising stretching the histogram to mark about 10% of the image's pixels; and
    said processor adding said histogram adjusted image to said source image as a dimensional layer.

15. The apparatus of claim 14, further comprising:
    said processor generating a bump map of said dimensional layer as an intermediate image to enable specular lighting simulation/visualization by modifying a surface normal.

16. The apparatus of claim 14, further comprising:
    said processor implementing user adjustable settings comprising any of depth, amount, and filter for adjusting said dimensional layer.

17. The apparatus of claim 14, further comprising:
    a visual editor for operating upon said dimensional printing channel in response to user inputs.

18. The apparatus of claim 14, said visual editor further comprising:
    a file, page, and image selection tool for displaying to a user individual images that appear on a selected page.

19. The apparatus of claim 14, said visual editor further comprising:
    at least one dimensional printing control for allowing a user to adjust the intensity of said dimensional layer.

20. The apparatus of claim 14, said processor deriving a clear channel specifically from content of said selected image, said clear channel providing said dimensional printing layer.

21. The apparatus of claim 14, said visual editor further comprising:
a control for simulating specular reflection on a selected page to allow a user to judge how much texture is applied to the source image.

22. The apparatus of claim 14, said visual editor further comprising:
a control for moving the histogram adjusted image to simulate texture in three dimensions.

23. The apparatus of claim 14, said visual editor further comprising:
a control for moving one or more simulated lights to display the image as it is moved around under different lighting conditions.

24. The apparatus of claim 14, said visual editor further comprising:
a control for insertion of a dimensional printing map, said dimensional printing map comprising an image file with which a specific dimensional printing layer is generated.

25. The apparatus of claim 24, said visual editor further comprising:
a plurality of tools for adjusting any of specular simulation and lighting of said dimensional printing map; simulating any of camera movement and illumination; scaling any size source image to fit a maximum image size; and providing side-by-side views of said source image and said dimensional printing map.

26. The apparatus of claim 14, wherein said dimensional printing channel comprises any of one or more channels of said source image.

27. The apparatus of claim 14, further comprising;
said processor selecting said source image by converting a file format to strips or tile, wherein a strip or tile comprises a subsection of a complete image placed on a page adjacent to other tiles or strips;
based on size and location of said tiles or strips, said processor combining said tiles or strips into a single full image for enhancement using heuristic algorithms; and
said processor applying a copy of said source image to said dimensional printing channel.

28. The apparatus of claim 27, further comprising:
providing a visual editor for operating upon said dimensional printing channel in response to user inputs, said visual editor comprising controls for dimensional printing comprising any of:
level which adjusts an amount of an image covered by clear ink;
smoothness which increases/decreases clear ink on fine details; and
invert which reverses a clear ink/no clear ink control image.

29. The apparatus of claim 27, wherein said dimensional printing channel comprises any of one or more channels of said image.

* * * * *